(12) United States Patent
Gorur et al.

(10) Patent No.: US 10,482,508 B2
(45) Date of Patent: *Nov. 19, 2019

(54) CUSTOMIZABLE STATE MACHINE AND STATE AGGREGATION TECHNIQUE FOR PROCESSING COLLABORATIVE AND TRANSACTIONAL BUSINESS OBJECTS

(71) Applicant: JDA Software Group, Inc., Scottsdale, AZ (US)

(72) Inventors: Chethan Gorur, Garland, TX (US); Ramkartik Mulukutla, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/607,231

(22) Filed: May 26, 2017

(65) Prior Publication Data

US 2017/0262909 A1 Sep. 14, 2017

Related U.S. Application Data

(60) Continuation of application No. 11/941,493, filed on Nov. 16, 2007, now Pat. No. 9,665,893, which is a division of application No. 09/978,277, filed on Oct. 15, 2001, now abandoned.

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |

(52) U.S. Cl.
CPC .......... *G06Q 30/06* (2013.01); *G06Q 10/067* (2013.01); *G06Q 10/103* (2013.01)

(58) Field of Classification Search
CPC ..... G06Q 30/06; G06Q 10/067; G06Q 10/103
USPC ................. 705/1.1–912, 301, 348; 709/205
See application file for complete search history.

(56) References Cited

U.S. PATENT DOCUMENTS

| | | |
|---|---|---|
| 4,939,071 A | 7/1990 | Barrera et al. |
| 5,053,849 A | 10/1991 | Izawa et al. |
| 5,288,660 A | 2/1994 | Hua et al. |
| 5,559,049 A | 9/1996 | Cho |
| 5,585,307 A | 12/1996 | Yoo |
| 5,688,704 A | 11/1997 | Liu |

(Continued)

OTHER PUBLICATIONS

Lin et al., "A Novel Self-Aligned T-Shaped Gate Process for Deep Submicron Si MOSFET's Fabrication", IEEE Electron Device Letters, vol. 19, No. 1, Jan. 1998, pp. 26-28.

(Continued)

*Primary Examiner* — Jonathan P Ouellette
(74) *Attorney, Agent, or Firm* — Spencer Fane LLP; Steven J. Laureanti

(57) ABSTRACT

A computer-implemented method is provided for aggregating state information associated with a composite business object representing at least one collaboration between business entities. The method includes retrieving the state information for the composite business object from a computer-readable medium and determining a state for the composite business object based on an assigned priority level for a state in a hierarchy of states associated with the composite business object, each state in the hierarchy of states having a corresponding assigned priority level.

18 Claims, 2 Drawing Sheets

(56) References Cited

U.S. PATENT DOCUMENTS

| | | | |
|---|---|---|---|
| 5,817,558 A | 10/1998 | Wu | |
| 5,856,232 A | 1/1999 | Yang et al. | |
| 6,041,306 A | 3/2000 | Du et al. | |
| 6,307,546 B1 | 10/2001 | Wickham et al. | |
| 6,332,155 B1 | 12/2001 | Notani | |
| 6,665,648 B2 | 12/2003 | Brodersen et al. | |
| 7,379,882 B2 | 5/2008 | Adams et al. | |
| 7,627,484 B2 | 12/2009 | Cohen et al. | |
| 2003/0050789 A1 | 3/2003 | Hasson et al. | |
| 2003/0050813 A1 | 3/2003 | Cohen et al. | |
| 2003/0050820 A1 | 3/2003 | Cohen et al. | |
| 2003/0050886 A1 | 3/2003 | Cohen et al. | |

OTHER PUBLICATIONS

A. Chatterjee et al., "Sub-100nm Gate Length Metal Gate NMOS Transistors Fabricated by a replacement Gate Process", IEEE, c. 1997, journal not identified.

Hisamoto et al., "A Low-Resistance Self-Aligned T-Shaped Gate for High-Performance Sub-0.1-um CMOS", IEEE transactions on Electron Devices, vol. 44, No. 6, Jun. 1997, pp. 951-956.

U.S. Department of Housing and Urban Development Signs $5.8 Million Agreement with MicroStrategy, Microstrategy, May 16, 2000 <http://www.microstrategy.com/news/pr_system/press_release.asp?ctry=167&id=437>.

Wakabayashi et al., "A High-Performance 0.1um CMOS with Elevated Salicide using Novel Si-SEG Process", IEEE, c. 1997, journal not identified.

BEA Tuxedo, Scaling, Distributing, and Tuning COBRA Applications, BEA Tuxedo Release 8.0, Document Edition 8.0, Jun. 2001.

i2 Announces the Inception of a New Business Super Portal at 11Planet 99SM: The High Velocity Business Summit which is dated Oct. 11, 1999.

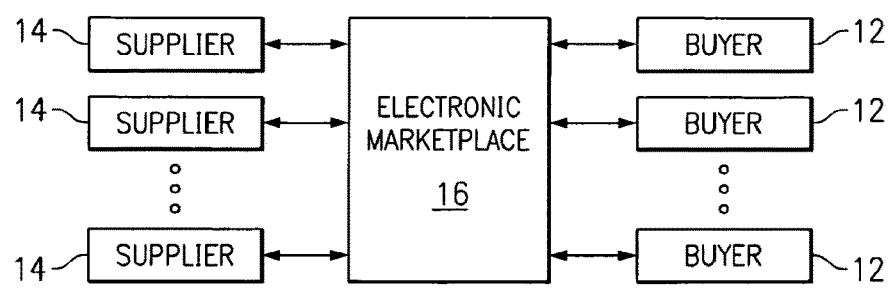
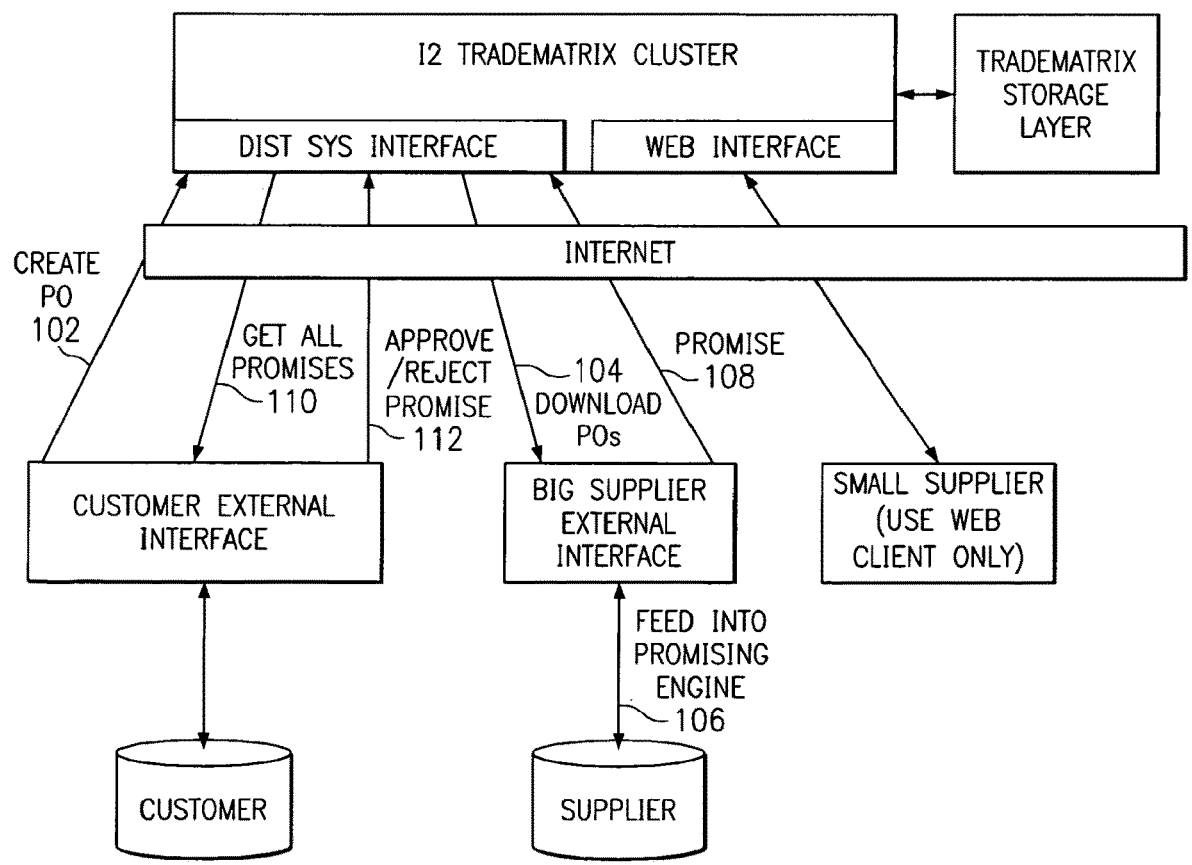

FIG. 3

```
public interface StateAggregator
{
    //Returns the resulting state based on composite states
    public State getAggregatedState (State [] compositeStates,
                                    GSContext gsc)
                throws StateAggregatorException;
    public String getAggregatorType()
                throws StateAggregatorException;
}

//Pseudo code illustrating the use of state aggregation
modifyPurchaseOrder (PO, ...)
{
    State [] lineItemStateArray;
    for every line Item
        State [] StateArray;
        for every schedule in line item
            process schedule to modify and pass through schedule state transition
            StateArray.add (new state of this schedule)
        Endfor
        State ResultingLineItemState =

POLineItemAggregator.getAggregatedState (StateArray)
        ModifyStateOfLineItem(lineItem, resultingLineItemState);
        LineItemStateArray.add(resultingLineItemState);
    Endfor
    State resultingPOState =

POStateAggregator.getAggregatedState(lineItemStateArray);
    ModifyStateOfPO (PO, resultingPOState);
}
```

CUSTOMIZABLE STATE MACHINE AND STATE AGGREGATION TECHNIQUE FOR PROCESSING COLLABORATIVE AND TRANSACTIONAL BUSINESS OBJECTS

CROSS-REFERENCE TO RELATED APPLICATIONS

This application is a continuation of U.S. patent application Ser. No. 11/941,493, filed on Nov. 16, 2007, entitled "Customizable State Machine and State Aggregation Technique for Processing Collaborative and Transactional Business Objects," which is a division of U.S. patent application Ser. No. 09/978,277, filed Oct. 15, 2001, and entitled "Customizable State Machine and State Aggregation Technique for Processing Collaborative and Transactional Business Objects." U.S. patent application Ser. Nos. 11/941,493 and 09/978,277 are assigned to the assignee of the present application. The subject matter disclosed in U.S. patent application Ser. Nos. 11/941,493 and 09/978,277 is hereby incorporated by reference into the present disclosure as if fully set forth herein.

TECHNICAL FIELD

The present invention relates in general to state machines and state machine design and, in particular, to a customizable state machine and state aggregation technique for processing collaborative and transactional business objects.

BACKGROUND

The use of object-oriented programming languages, such as C++, Smalltalk, JAVA, and Object Pascal, has allowed system designers and programmers to significantly increase the design flexibility and performance of business applications in electronic commerce environments. Object-oriented programming languages allow programmers to define the data type of a data structure, and the types of operations that can be applied to the data structure. As a result, the data structure becomes an "object", which is a self-contained entity that includes both data and the procedures (e. g., code) to manipulate the data. Also, programmers can create relationships between objects. For example, an object can be created that can inherit certain characteristics of other objects. As such, a primary advantage of object-oriented programming over previous programming techniques is that programmers can create software components that do not have to be changed when a new type of object is introduced. A programmer can create a new object that inherits some of its characteristics from the existing objects. Consequently, object-oriented software is typically much more design flexible than software developed according to previous programming techniques, because the object-oriented software is relatively easy to modify. Also, using object-oriented software, object databases that store objects directly can be used. An object stored in an object database can reference another object without the use of linking fields (such as in relational databases). As a result, object databases are typically much more powerful than relational databases when handling complex object relationships with complex data types. In order to take advantage of object-oriented programming techniques, relational database manufacturers are in the process of combining relational and object technologies. Also, it is possible to use objects in non-object-oriented languages, by the use of function calls that are driven by object-oriented mechanisms.

A business object is an object that is modeled from a business concept, such as, for example, a business person, place, event, or process. As such, business objects can be created to represent actual business entities, such as products, Purchase Orders, invoices, payments, customers, suppliers, employees, etc. Business objects are scalable and can be deployed in various configurations and at multiple levels. By taking advantage of object-oriented technologies, business objects can be used to develop and customize business applications.

In an electronic marketplace, enterprises (e.g., business organizations) must regularly collaborate to carry out their operations. For example, enterprises may collaborate with respect to sourcing, design, production, and any other suitable activities. However, certain business objects in a collaborative application tend to be very reactive. In other words, their semantics (the meanings of their instructions) can change radically based on the actions taken by different entities in the collaborative application space. In this regard, it is crucial for designers to accurately model these business objects and their potential behavior based on the actions undertaken. The entities (e.g., business enterprises) in a collaborative application space can perform a set of well-defined actions on these business objects, which actions are based on the objects' stage of processing. These business objects carry logic that is specifically related to the particular business implementations involved. Consequently, when such a collaborative application is deployed, the collaborative application needs to have sufficient flexibility to appropriately define the workflows and semantics for the business objects involved.

State machines can be suitable vehicles for processing business objects and the various states encountered during the objects' life cycles. However, existing state machine design approaches are incapable of effectively accounting for complex workflows and problems encountered in a collaborative environment. As a result, there is a pressing need for a design approach that can simplify state machine design for a collaborative business environment, in terms of flexibility, customization, and deployment, and that also can realize a high level of performance for the business applications involved.

SUMMARY

According to the present invention, problems and disadvantages associated with previous state machines and state machine design techniques may be reduced or eliminated.

In accordance with one example embodiment of the present invention, a computer-implemented state machine is provided for processing business objects representing collaborations between business entities. At least one business object represents a collaboration between business entities. A number of graphs represented in computer-readable media each correspond to a particular collaborating business entity. The graphs are generated using text files, at least a first text file including state information for the business object, at least a second text file including action information for the business object, and at least a third text file including transition information for the business object.

In accordance with another example embodiment of the present invention, a computer-implemented method is provided for aggregating state information associated with a composite business object representing at least one collaboration between business entities. The method includes retrieving the state information for the composite business object from a computer-readable medium and determining a state for the composite business object based on an assigned priority level for a state in a hierarchy of states associated with the composite business object, each state in the hierarchy of states having a corresponding assigned priority level.

In collaborative applications, certain hierarchical and composite business objects may need to carry state information. Also, the components and children of such business objects may need to carry state information. In many cases, a composite business object may need a derived state based on the individual states of the composite business object's components. As such, in accordance with one example embodiment of the present invention, a state aggregation method is provided, whereby a composite business object can include a derived state computed from the individual states of the business object's components. As a result, the state aggregation method can provide a mechanism for propagating state information in a hierarchical (e.g., multi-tiered) business object.

Certain embodiments of the present invention can provide one or more technical advantages. For example, particular embodiments can provide a powerful, customizable state machine for handling collaborative and transactional business objects in an electronic marketplace environment. Particular embodiments can provide a customizable state machine for use in handling collaborative and transactional business objects that can serve as a rules engine for the business objects involved. A permissibility/security component of the collaborative state machine can allow different entities within an enterprise to have different views of the same state machine. Also, the collaborative state machine provides a capability for restricting different entities in different enterprises to a certain extent so that the different entities can perform similar or related functions. Particular embodiments can provide sufficient flexibility for implementers of collaborative applications to appropriately define the workflows and semantics for the business objects involved. Particular embodiments can also adequately account for complex workflows and problems encountered in a collaborative environment, such as, for example, appropriately integrating collaborators' systems with third party Enterprise Resource Planning (ERP) systems or other Systems of Record (SORs), optimizing concurrency, providing user-defined semantics for states and transitions, providing suitable security at the state and action levels, providing an ability to readily alter the state machine to suit the needs of specific entities, and sending notification messages associated with state transitions. Particular embodiments can produce a simplified state machine design for a collaborative business environment, in terms of flexibility, customization, and deployment that also can realize a high level of performance for the business applications involved. Furthermore, particular embodiments can provide state aggregation as a powerful mechanism for propagating state information in hierarchical or multi-tiered business objects.

Systems and methods incorporating one or more of these or other technical advantages may be well suited for modern electronic commerce environments. One or more other technical advantages of the present invention may be readily apparent to one skilled in the art from the figures, description, and claims included herein.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates an example system that can be used to implement a customizable state machine for processing collaborative and transactional business objects in an electronic marketplace environment, in accordance with one example embodiment of the present invention;

FIG. 2 is a diagram that illustrates certain interactions that can occur between entities in a collaborative application, and how the collaborative state machine can facilitate a distributed synchronization of collaborative business objects, in accordance with one example embodiment of the present invention; and FIG. 3 is a diagram illustrating programming pseudocode for using an example state aggregator, in accordance with one example embodiment of the present invention.

DETAILED DESCRIPTION

Preferred embodiments of the present invention and its advantages are best understood by referring to FIGS. 1-3 of the drawings, like numerals being used for like and corresponding parts of the various drawings.

FIG. 1 illustrates an example system 10 that can be used to implement a customizable state machine for processing collaborative and transactional business objects in an electronic marketplace environment, in accordance with one example embodiment of the present invention. System 10 may include buyers 12, suppliers 14, and a business-to-business (B2B), business-to-consumer (B2C), or other electronic marketplace 16 that can link buyers 12 to suppliers 14. Electronic marketplace 16 may be associated with one or more websites accessible to buyers 12 and suppliers 14. In general, suppliers 14 can make products or other items available to buyers 12 and may collaborate with buyers 12 in one or more ways to establish and maintain appropriate buyer-supplier relationships. Depending on the nature of electronic marketplace 16 and the market it supports, suppliers 14 may include manufacturers, distributors, wholesalers, retailers, or any other entities that supply items to and may collaborate with buyers 12 using electronic marketplace 16. Preferably, a database (not shown) associated with electronic marketplace 16 can store collaborative data supplied by buyers 12 and suppliers 14 to electronic marketplace 16 based on their collaborations, executions, and any other suitable interactions between buyers 12 and suppliers 14 through electronic marketplace 16.

Buyers 12, suppliers 14, and electronic marketplace 16 may each operate on one or more computer systems at one or more locations and may share data storage, communications, or other resources according to particular needs. These computer systems may include appropriate input devices, output devices, mass storage media, processors, memory, or other components for receiving, processing, storing, and communicating information in accordance with operation of system 10. Computer systems referred to herein may each include one or more individual computers at one or more suitable locations. Buyers 12 and suppliers 14 may interact with electronic marketplace 16 autonomously or in accordance with input from one or more users.

Buyers 12 and suppliers 14 may be coupled to electronic marketplace 16 using one or more local area networks (LANs), metropolitan area networks (MANs), wide area networks (WANs), a global computer network such as the Internet, or any other suitable wireline, optical, wireless, or other links. Buyers 12, suppliers 14, and electronic marketplace 16 may communicate with each other according to a hub-and-spoke, peer-to-peer, or other suitable architecture. For example, system 10 can be implemented using a huband-spoke architecture in which spokes are appropriately integrated with enterprise systems of buyers 12 and suppliers 14 to allow schedule-based data transfer between these enterprise systems and electronic marketplace 16. In a particular embodiment, buyers 12 and suppliers 14 can communicate with electronic marketplace 16, at least in part, in the form of Hypertext Markup Language (HTML), Extensible Markup Language (XML), or other files contained in Hypertext Transfer Protocol (HTTP) messages.

Essentially, in accordance with the present invention, a customizable state machine for use in handling or processing collaborative and transactional business objects is provided (hereinafter referred to as a "collaborative state machine"), which can serve as a rules engine for the business objects involved. A permissibility/security component of the collaborative state machine can allow different entities within an enterprise to have different views of the same state machine. Also, the collaborative state machine can provide a capability for restricting different entities in different enterprises to a certain extent so that the different entities can perform similar or related functions. For example, if an entity is performing a purchase order management function, some of that entity's users can be processing change orders, while other users can be processing order cancellations.

In collaborative applications, certain hierarchical and composite business objects may need to carry state information as well. Also, the components and children (immediate descendants) of such business objects may need to carry state information. In many cases, a composite business object may need a derived state based on the individual states of the composite business object's components. As such, in accordance with one example embodiment of the present invention, a state aggregation technique is provided, whereby a composite business object can include a derived state computed from the individual states of the business object's components. As a result, the state aggregation method can provide a mechanism for propagating state information in a hierarchical (e.g., multi-tiered) business object.

In accordance with one example embodiment of the present invention, a collaborative state machine is provided, which can successfully process reactive business objects and handle their modeling requirements. As a result, the business objects can transition through a set of states in their respective life cycles, and each of the business objects can maintain a particular semantic for the entities involved. Assuming, for example, that one set of states and rules may not satisfy the needs of every combination of entities involved in a collaborative application, the collaborative state machine can enable each group of collaborating entities to set its own rules for the collaboration life cycle of the business objects involved. As such, the collaborative state machine is highly configurable and deployable.

In accordance with one example embodiment of the present invention, the collaborative state machine can be represented by a set of adjacency graphs, with one such graph for each entity in the collaborative application space. An adjacency graph may be referred to as a state transition graph where appropriate. The nodes in such a graph can represent states, and the links in such a graph can represent actions. Preferably, a set of states can be constant for all of the graphs involved. As described in detail below, the collaborative state machine can appropriately handle problems encountered with previous techniques, such as appropriately integrating collaborators' systems with third party ERP systems or other SORs, optimizing concurrency, providing user-defined semantics for states and transitions, providing suitable security at the state and action levels, providing an ability to readily alter the state machine to suit the needs of specific entities, and sending notification messages associated with state transitions. Notification messages sent out when certain state transitions occur can be conveyed in various forms, such as using emails, faxes, or event logs. Also, the collaborative state machine can serve as a rules engine that dictates the life cycle and side effects for the business object or objects involved.

More specifically, the collaborative state machine can control and execute the life cycles of business objects involved. As such, a processor (not shown) associated with electronic marketplace 16 can load the collaborative state machine into memory for operation when a business application (e.g., software application) is initiated. The processor can also be used to implement the collaborative state machine, which can be thread-safe and highly scalable, as described below. As such, the collaborative state machine can include data structures that contain information about states, actions, transitions, and update rules. Also, the collaborative state machine can include lightweight "wrappers" overlaying the data structures, which can provide security checks and high performance interfaces for accessing information in the data structures. Furthermore, the collaborative state machine can include state handlers for handling update rules and implementing rules engines, and also provide suitable interfaces with other components in any system involved.

As mentioned earlier, the collaborative state machine can include a set of graphs may be stored or otherwise represented in memory, each graph corresponding to a particular collaborating business entity. For example, a graph may be defined as a collection of dots, with some pairs of dots being connected by lines. The dots may be referred to as vertices, and the lines may be referred to as edges. As such, an adjacency matrix is an appropriate memory structure that can be used to store such graphs. For example, an adjacency matrix can be defined as a 01 square matrix whose rows and columns are indexed by the vertices. A "1" in the $ij^{th}$ position of the matrix can mean that there is an edge from vertex i to vertex j. A "0" in the $ij^{th}$ position of the matrix can indicate that there is no such edge. Where appropriate, an adjacency matrix may be referred to as a state transition matrix.

For one example embodiment of the present invention, a collaborative state machine can include a number of graphs each corresponding to a particular collaborating business entity. The graphs can be stored in a three-dimensional adjacency matrix for the state machine. For example, for a collaborative application, one dimension of the matrix can represent a State identifier (ID), a second dimension of the matrix can represent an Action ID, and a third dimension of the matrix can represent an Entity ID. Using suitable adjacency matrix computation techniques, information stored in the three-dimensional adjacency matrix for the state machine can represent resulting state values.

For example, state information can be stored in tables or other text files located in memory at locations indexed (e.g., addressed) by the states' user names and IDs. Similarly, action information can be stored in tables or other text files located in memory at locations indexed by the actions' user names and IDs. As a result, clients or users can request the collaborative state machine to provide up-to-date information stored in one or more of these tables with respect to states, actions, and any resulting state derived from a matrix computation (e.g., an adjacency matrix computation). Also, the collaborative state machine can perform a permissions or security check, whereby the collaborative state machine can determine the permissions or security level context for a user and verify the authenticity and permission masks (e.g., information also stored in memory associated with electron marketplace 16) with respect to state and action information requested by the user. Furthermore, all action descriptions (e.g., rules based on what updates occur at transitions) can be stored in memory as part of an action's object. Advantageously, the relatively "lightweight" memory structure described above with respect to the present invention supports a relatively high degree of scalability.

For one example embodiment of the present invention, each state can have one or more sub-states (e.g., preferably with one level of nesting). The sub-states can inherit the transitions of their respective super-states. Similar to states, sub-states can also be modeled from a business logic perspective. For example, an order for a product may be placed on "hold". From a business logic standpoint, an order being placed on "hold" does not necessarily mean that the order's state has completely changed. The order can be temporarily placed on "hold" until an action is taken to release that "hold". In this case, the "hold" can be modeled as a sub-state.

In accordance with one example embodiment of the present invention, a collaborative state machine can be modeled as a rules engine for the semantics of the business objects over their respective lifecycles. For example, the collaborative state machine can maintain (in memory) an action description for each action defined for the system involved. In this regard, an action description can be modeled as an object that is a container for rules. The collaborative state machine can be designed to "understand" a fixed set of rules. As such, a system designer, programmer, or other implementer can configure the action update rules as a subset of the fixed set of rules. For example, an action "CUSTOMER_CANCEL" taken by an entity type "CUSTOMER" can be associated with the following action update rules: "UPDATE_STATE|SUPPLIER_SYNC_DOWN|DEBIT_CREDIT_CARD". For this credit card example, the above-described rules can mean that when a customer performs a "CUSTOMER_CANCEL" action to cancel a credit card charge, the system can update the original state of the transaction to the new state ("UPDATE_STATE"), and set an associated "SUPPLIER_SYNC" flag down. The credit card charge is then refunded.

Action descriptions can be used as "commands" for the collaborative state machine to perform a particular operation or set of operations. For example, such operations can include updating database information for certain business objects, inserting or deleting certain business objects, and/or invoking other models (e.g., a model to perform a blanket Purchase Order netting application).

State handlers are classes (an object is defined via its class) that can provide the logic for all transitions from a given state. State handlers can control "what needs to be done" when a business object changes state. The collaborative state machine enables implementers to write their own state handlers, which can be plugged into the collaborative state machine. In this regard, a default state handler can be included to handle all update rules (e.g., described earlier). However, individual state handlers can be written to suit the needs of specific applications, if the default behavior of such applications is inappropriate and the default state handler should be overwritten.

In accordance with one example embodiment of the present invention, the collaborative state machine can associate different types of notifications to the various state transitions that can occur in a business application. This notification function allows users to subscribe to specific state transitions that can occur in a system. The content of a notification message can be configured at the state transition level. For each state transition that occurs, the content of an associated notification message to be sent out can be configured, and any information contained within a business object can be included in the content of the message. Notification messages can also be sent out for state changes occurring at higher levels, such as in the case of hierarchical objects (e.g., in conjunction with state aggregators as described below). This notification framework provides a high level of customization, by providing a capability for users to selectively subscribe to different events that can occur with respect to a given business object. As a result, users can have external entities invoked if certain state transitions occur.

In operation, a processor (e.g., associated with electronic marketplace 16) can read the collaborative state machine information from a file system and load it into working memory. Alternatively, based on design preferences, the collaborative state machine can be stored in a database. For one example embodiment, the processor can construct the collaborative state machine, using tables or other text files stored in memory or a database, to include a number of graphs stored in a three-dimensional or other appropriate adjacency matrix for the state machine, where each graph corresponds to a particular collaborating entity. At implementation time, a user can configure these tables to suit the particular business scenario. Customization of the collaborative state machine can include changing the user names of states, changing action descriptions, and adding new states, actions, and their associated transitions.

An application server (e.g., associated with electronic marketplace 16) can use system names internally as a primary key for all references to states and actions. For one example embodiment, the collaborative state machine can perform mapping between system names and user names, so that the user names can be changed at any time if so required by the business logic involved. States and actions can have an associated user name that can be customized to suit specific business needs.

As mentioned above, for example, three tables (e.g., text files) can be used to represent the collaborative state machine. An example structure and content for one such file (e.g., "State.txt" or state file) that can be used to represent the collaborative state machine is shown in Table 1 below:

TABLE 1

| STATE NAME (User/System) | SSOR ENABLED | CSOR ENABLED | SUPER STATE | HANDLER CLASS |
| --- | --- | --- | --- | --- |
| New Order Line/ System Initial | 0 | 0 | $null | com.i2.gs . . . GenerieStateHandler |
| Open/Open | 0 | 0 | $null | com.i2.gs . . . GenerieStateHandler |
| Customer Cancelled/ C.Cancelled | | | | com.i2.gs . . . GenerieStateHandler |

For example, the "State.txt" file (above) can contain information for the existing states in the system, the way the states are to be handled or processed, their SOR synchronization requirements, and their super-state relationships. Each state can be characterized by a unique user name, as well as a unique system name. The system name can be stored in memory (or a database), while the user name is visible to a user. As a result. context-specific names can be assigned to states. For a collaborative application, a state object can include two fields: Customer Sync and Supplier Sync. These fields can be used for "locking" the specific business object for SOR synchronization (e.g., CSOR and SSOR for Customer SOR and Supplier SOR, respectively). An SOR Enabled flag on a state indicates that the state requires sync checks. For example, if the SOR flags are down (the state requires SOR synchronization), and the role type (e.g., customer or supplier) indicates SOR Enabled, that record is locked for all non-sync actions. All transitions are directed from a super-state to a sub-state (if there are such sub-states). The handler class field defines the state handler class for transitions. For example, the handler class can default to a generic handler, as shown in Table 1.

An example structure and content for a second such file (e.g., "Action.txt" or action file) that can be used to represent the collaborative state machine is shown in Table 2 below:

TABLE 2

| ACTION NAME (User/System) | ACTION DESCRIPTION |
| --- | --- |
| Supplier Accept/ S.ACCEPT | UPDATE_STATE \| UPDATE_DATA |
| Customer Cancel/ C.CANCEL | UPDATE_HEADER \| UPDATE_LINE_ITEM \| UPDATE CDS SYNC FLAG |

For example, the "Action.txt" file can contain information for the allowed actions in the system, along with their update rules. The action description field constitutes a set of rules to apply when the action occurs. This field (e.g., can be optional) provides a configurable way to describe the semantics of actions. An action description, if present in this field, describes what happens when the action is applied to a state. The entries in this column can be predefined strings delimited with a bit-wise "OR" operator "|". For example, the action description shown in Table 2 of "UPDATE_STATE-|UPDATE_DATA" tells the server that when this action is encountered, the state is updated first, and then the data is updated.

An example structure and content for a third such file (e.g., "Trans.txt" or transition file) that can be used to represent the collaborative state machine is shown in Table 3 below:

TABLE 3

| Collaborating entity type | START STATE | ACTION | RESULTING STATE |
| --- | --- | --- | --- |
| CUSTOMER | New Order Line | Supplier Accept | Open |
| SUPPLIER | New Order Line | Customer Cancel | Customer Cancelled |

For example, the "Trans.txt" file can contain transitions as qualified by a collaborating entity type. Examples of such collaborating entity types can be: CUSTOMER, SUPPLIER, TRANSPORT PROVIDER, etc. As such, names in the "Trans.txt" file can be the user names of the states and actions involved. This file tells the server the resulting state on an action for the role (collaborating entity type).

In accordance with the present invention, the collaborative state machine is designed advantageously to allow actions to be reusable for different states, which serves to keep the collaborative state machine's structure and operation relatively "lean". Typically, certain kinds of actions can be repeated for many states. For example, a "Cancel" Action can be undertaken for most states. Consequently, the collaborative state machine advantageously allows the same semantics to be reused for different states.

Once the collaborative state machine is loaded successfully into memory (or a database), the updates and state changes associated with the business objects bound by the collaborative state machine can be controlled by the collaborative state machine. As such, the update and read routines are written to interact with the collaborative state machine. In implementation, more than one collaborative state machine may be used. For example, a different collaborative state machine can be used for each type of business object that carries state information. As such, different collaborative state machines can be used to control the handling of different Purchase Orders. A Purchase Order can associate itself with the specific state machine through a grouping criteria present on the Purchase Order. Similarly, as another example, different collaborative state machines can be used to control the handling of different Advance Shipment Notices, because their rules and states can be different.

A User Interface (UI) can be used to communicate with the collaborative state machine to fetch all possible states that a logged-in user may desire to view (e.g., on a computer monitor), and also fetch actions that the user can take for the business objects that are being displayed. Alternatively, the collaborative state machine can also drive the UI rendering of an object to be viewed.

For one example embodiment, batch processes can be used for setting certain actions for the business objects involved, and conveying the actions for updates to occur. In this regard, update and insert Application Program Interfaces (APIs) can be used to communicate with the collaborative state machine in order to validate actions based on the existing state of the business object involved, and also to determine the resulting state as well as the data to be updated or inserted. Most of the batch read operations can be based on state events as the principal restrictions (e.g., fetch all Purchase Orders that are in a "New" state). In this case, a read API can communicate with the collaborative state machine to ensure that the particular batch process can pass the security requirements for the requested state.

As mentioned above, the lifecycle of a business object (e.g., Purchase Order) is preferably controlled using the collaborative state machine. As a result, the collaborative state machine can allow different "client" mechanisms (e.g., XML, flat files, Web-based interface, etc.) to operate on the same business object and "walk" it through its lifecycle independently of the mechanism that is changing the business object's state.

FIG. 2 is a diagram that illustrates certain interactions that can occur between entities in a collaborative application, and how the collaborative state machine can facilitate a distributed synchronization of collaborative business objects, in accordance with one example embodiment of the present invention. Typically, (102) a business object (e.g., Purchase Order) can be created in an SOR and conveyed (e.g., via the Internet) to a collaborative application server (e.g., TRADEMATRIX application server developed by i2 TECHNOLOGIES US, INC.). Another party in the collaboration space can retrieve the object (e.g. Purchase Order) from the application server, convey the object back to its SOR, and process the object (104). After processing of the object is completed (106), that party can convey (108) the business object back to the collaborative application server (e.g., as a promise in response to the Purchase Order), so that other parties can process the object. For example, the party that created the Purchase Order can retrieve the object (including the promise) from the application server (110), process the object, and if needed, convey the object (e.g., representing an approval or rejection of the promise) to the application server (112).

As mentioned earlier, in accordance with the present invention, the collaborative state machine ensures that the consistency of data is maintained during the processing cycle. The collaborative state machine also ensures that the consistency of data is readily configurable. As such, the collaborative state machine is capable of providing a dual mode of operation (e.g., with or without SOR synchronization). For example, in some business collaboration scenarios, a party may or may not have a SOR. For example, a relatively large business organization may have a SOR, but some of its smaller-sized suppliers may not be able to afford a SOR. In this case, the collaborative state machine can determine that "locking" (e.g., locked together in synchronization) between entities should not be enforced. The entity without an SOR can interact with the other entity's (e.g., one that has a SOR) application server via the application server's UI (or other such interface). As such, each entity in a system can have information associated with its need for synchronization stored within that entity's profile. For example, an entity without a SOR may have profile information that indicates synchronization is not required.

Furthermore, the collaborative state machine provides synchronization options on per state and per entity bases, by controlling a locking function in accordance with the particular state and/or entity involved. For certain states, as mentioned above, synchronization locking may not be required and thus not enforced for a particular entity. For example, a customer does not have to be locked for entity synchronization for an order in a "shipped" state, because the only updates allowed for that state are for suppliers. As a result of allowing synchronization options, the collaborative state machine provides more flexibility for application implementers than previous techniques, enables the implementers to readily customize business applications, and thereby increase their performance.

As another example, locking might be required for the following collaborative business scenario. On Jun. 10, 2001 a customer in Dallas, Tex. requests one hundred computers from a supplier. In response, the supplier can retrieve this information from the collaborative application, process the information through the supplier's specialized SOR, and return to the customer on Jun. 10, 2001 at Dallas, Tex., with a promise of ninety computers. It is preferable that the customer not change the order until after the supplier returns with a response. Consequently, a locking mechanism can be used to ensure that the order is not changed until a response is returned.

Furthermore, the collaborative state machine advantageously ensures that integration with external SORs is easily achieved. Importantly, the collaborative state machine can make this integration configurable at state level. For example, the collaborative state machine can accomplish such integration by attaching one or more SOR flags to a state as part of its meta-information (as described above), along with detailed profile information about the entities involved. Each instance of state can have a plurality of flags that determine the synchronization status of the collaborating entities. For example, if an entity has a SOR, and a corresponding SOR flag is down for an object, the collaborative state machine can ensure that an update will not go through for that object, and also set a flag that an update error has occurred.

The collaborative state machine can enable a VI to decide how to render objects based on state events. The actions update rules can provide information to the UI about all possible updates for a particular object (e.g., being displayed to a user). Also, for object rendering purposes, the collaborative state machine can include certain UI-specific update rules as part of the general update rules. Furthermore, in certain instances, the collaborative state machine can drive the workflow for an object. For example, a UI can contact the collaborative state machine to determine the types of updates that are possible for a given action, and use a particular workflow for objects undertaking that action.

As described earlier, the action description for an action informs an application about "What to do when this action occurs". A UI can also use this type of information to determine "What a user can be allowed to do if a business entity is in this state". As a result, the UI can decide what to display to a user when showing a business object (e.g., Purchase Order) in a particular state. Also, the UI can decipher what table "columns" can be edited in a particular state. In this way, the collaborative state machine enables UIs to be highly configurable, which lends itself to a highly customizable collaborative state machine.

For hierarchical objects, a "state" at higher levels in a hierarchy can be a computation based on the states of the preceding lower levels. In accordance with an example embodiment of the present invention, a state aggregation method is provided to augment a collaborative state machine in order to effectively handle such hierarchical objects. As such, state aggregators can facilitate a different type of collaborative state machine at the higher levels of hierarchical business objects. This slightly different type of collaborative state machine can be referred to as a "Computed State Machine". The state aggregators, which are configurable, can form configurable business logic that drives the Computed State Machine at the aggregate level. In some implementations, the lowest level object can go through an entire state transition, and the higher level objects may just be containers of information (i.e., no transitions). As such, the entities in the collaboration do not operate directly on the higher level object. Consequently, in accordance with the present invention, the state of the higher level object can be computed as an aggregation.

For example, a state aggregator can take an array of states for composite objects, and decide what the higher level state should be. For example, a Purchase Order level state aggregator can review the states of the composite line items of the Purchase Order, and decide what the state of the Purchase Order should be. As such, in accordance with the present invention, aggregators can be defined for all composite items that are composed of objects that have state characteristics. Such a state aggregator can have the following requirements. First, the state aggregator file is to be loaded into memory at implementation time. As such, an implementer can write its own state aggregator if so desired. A pointer to a memory address for that state aggregator can be placed in a property file. Second, a default implementation is to be provided for the state aggregators based on state priorities. An implementer can select the default implementation, and customize one or more of the state priorities for the specific business model involved. Third, a state aggregator has to suitably handle transaction semantics and concurrency issues.

FIG. 3 is a diagram illustrating programming pseudocode for using an example state aggregator, in accordance with one embodiment of the present invention. Essentially, referring to FIG. 3, in most cases, state aggregation can be performed by assigning priorities to states, and selecting the state having the highest priority as the resulting state. A priority aggregator can perform this function by reading the priorities of states, and maintaining the priority information in the priority aggregator's tables. For example, a file for a priority aggregator can be referred to as an "Aggregator-priorities.txt" file, and can be read from a file system when the application server is loaded for operation. An example structure for the information that can be maintained in an Aggregator-priorities.txt file is shown in Table 4 below:

TABLE 4

| STATE NAME | PRIORITY |
| --- | --- |
| NEW ORDER LINE | 1 |
| OPEN | 2 |

In implementing an Aggregator_priorities.txt file, an assumption can be made that the smaller "priority" numbers in the file represent higher priorities than the larger numbers. Preferably, no negative priority numbers are used, and no two states in the file are allowed to have the same priority.

Although preferred embodiments of the present invention have been illustrated in the accompanying drawings and described in the foregoing description, it will be understood that the invention is not limited to the embodiments disclosed, but is capable of numerous rearrangements, modifications and substitutions without departing from the spirit of the invention as set forth and defined by the following claims.

What is claimed is:

1. A computer-implemented method for facilitating processing by a state machine of business objects, comprising:
   retrieving, over a computer network, composite state information of a composite business object from a non-transitory computer-readable medium, the composite business object representing at least one collaboration between two or more business enterprises and including one or more components comprising component state information;
   controlling the composite state information of the composite business object based on one or more data structures comprising state information stored as values in a multidimensional state transition matrix, action information, and transition information associated with the composite business object, wherein a first dimension of the state transition matrix represents a state identifier associated with the composite business object, a second dimension of the state transition matrix represents an action identifier associated with the composite business object, and a third dimension of the state transition matrix represents an entity identifier associated with the composite business object; and
   configuring a derived state information for the composite business object by assigning a priority level from a hierarchy of states to the individual component state information of the one or more components and selecting the component state information having the highest priority, each state in the hierarchy of states having a corresponding assigned priority level.

2. The computer-implemented method of claim 1, wherein the assigned priority level comprises a highest priority level.

3. The computer-implemented method of claim 1, wherein the state information comprises at least one of state identifier information, state handler class information, synchronization requirement information, and super-state relationship information.

4. The computer-implemented method of claim 3, wherein the action information comprises at least one of allowed action information and update rule information.

5. The computer-implemented method of claim 3, wherein the transition information comprises at least one of entity type information, starting state information, action taken information, and resulting state information.

6. The computer-implemented method of claim 3, wherein the business object is processed using one of two or more state machines within a computer-implemented system for collaboration between business entities, each state machine comprising a state transition matrix that contains information representing a plurality of graphs for the state machine and that has been generated using two or more text files for the state machine, each graph corresponding to a particular collaborating business entity.

7. A non-transitory computer-readable medium embodied with software method for facilitating processing by a state machine of business objects, the software when executed using one or more computers is configured to:
   retrieve composite state information of a composite business object from a non-transitory computer-readable medium, the composite business object including one or more components comprising component state information;
   control the composite state information of the composite business object based on one or more data structures comprising state information stored as values in a multidimensional state transition matrix, action information, and transition information associated with the composite business object, wherein a first dimension of the state transition matrix represents a state identifier associated with the composite business object, a second dimension of the state transition matrix represents an action identifier associated with the composite business object, and a third dimension of the state transition matrix represents an entity identifier associated with the composite business object; and
   configure a derived state information for the composite business object by assigning a priority level from a hierarchy of states to the individual component state information of the one or more components and selecting the component state information having the highest priority, each state in the hierarchy of states having a corresponding assigned priority level.

8. The non-transitory computer-readable medium of claim 7, wherein the assigned priority level comprises a highest priority level.

9. The non-transitory computer-readable medium of claim 7, wherein the state information comprises at least one of state identifier information, state handler class information, synchronization requirement information, and super-state relationship information.

10. The non-transitory computer-readable medium of claim 9, wherein the action information comprises at least one of allowed action information and update rule information.

11. The non-transitory computer-readable medium of claim 9, wherein the transition information comprises at least one of entity type information, starting state information, action taken information, and resulting state information.

12. The non-transitory computer-readable medium of claim 9, wherein the business object is processed using one of two or more state machines within a computer-implemented system for collaboration between business entities, each state machine comprising a state transition matrix that contains information representing a plurality of graphs for the state machine and that has been generated using two or more text files for the state machine, each graph corresponding to a particular collaborating business entity.

13. A system for facilitating processing by a state machine of business objects, comprising:
   an electronic marketplace comprising two or more business enterprises;
   at least one supplier entity of the two or more business enterprises, wherein the at least one supplier entity supplies one or more products; and
   the electronic marketplace configured to:
      retrieve composite state information of a composite business object from a non-transitory computer-readable medium, the composite business object representing at least one collaboration between the two or more business enterprises comprising and including one or more components comprising component state information;
      control the composite state information of the composite business object based on one or more data structures comprising state information stored as values in a multidimensional state transition matrix, action information, and transition information associated with the composite business object, wherein a first dimension of the state transition matrix represents a state identifier associated with the composite business object, a second dimension of the state transition matrix represents an action identifier associated with the composite business object, and a third dimension of the state transition matrix represents an entity identifier associated with the composite business object; and
      configure a derived state information of the composite business object by assigning a priority level from a hierarchy of states to the individual component state information of the one or more components and selecting the component state information having the highest priority, each state in the hierarchy of states having a corresponding assigned priority level.

14. The system of claim 13, wherein the assigned priority level comprises a highest priority level.

15. The system of claim 13, wherein the state information comprises at least one of state identifier information, state handler class information, synchronization requirement information, and super-state relationship information.

16. The system of claim 15, wherein the action information comprises at least one of allowed action information and update rule information.

17. The system of claim 15, wherein the transition information comprises at least one of entity type information, starting state information, action taken information, and resulting state information.

18. The system of claim 15, wherein the business object is processed using one of two or more state machines within a computer-implemented system for collaboration between business entities, each state machine comprising a state transition matrix that contains information representing a plurality of graphs for the state machine and that has been generated using two or more text files for the state machine, each graph corresponding to a particular collaborating business entity.

* * * * *